Dec. 8, 1936.　　　　F. F. LOOCK　　　2,063,099
ENCLOSURE FOR ELECTRICAL DEVICES
Filed July 30, 1934
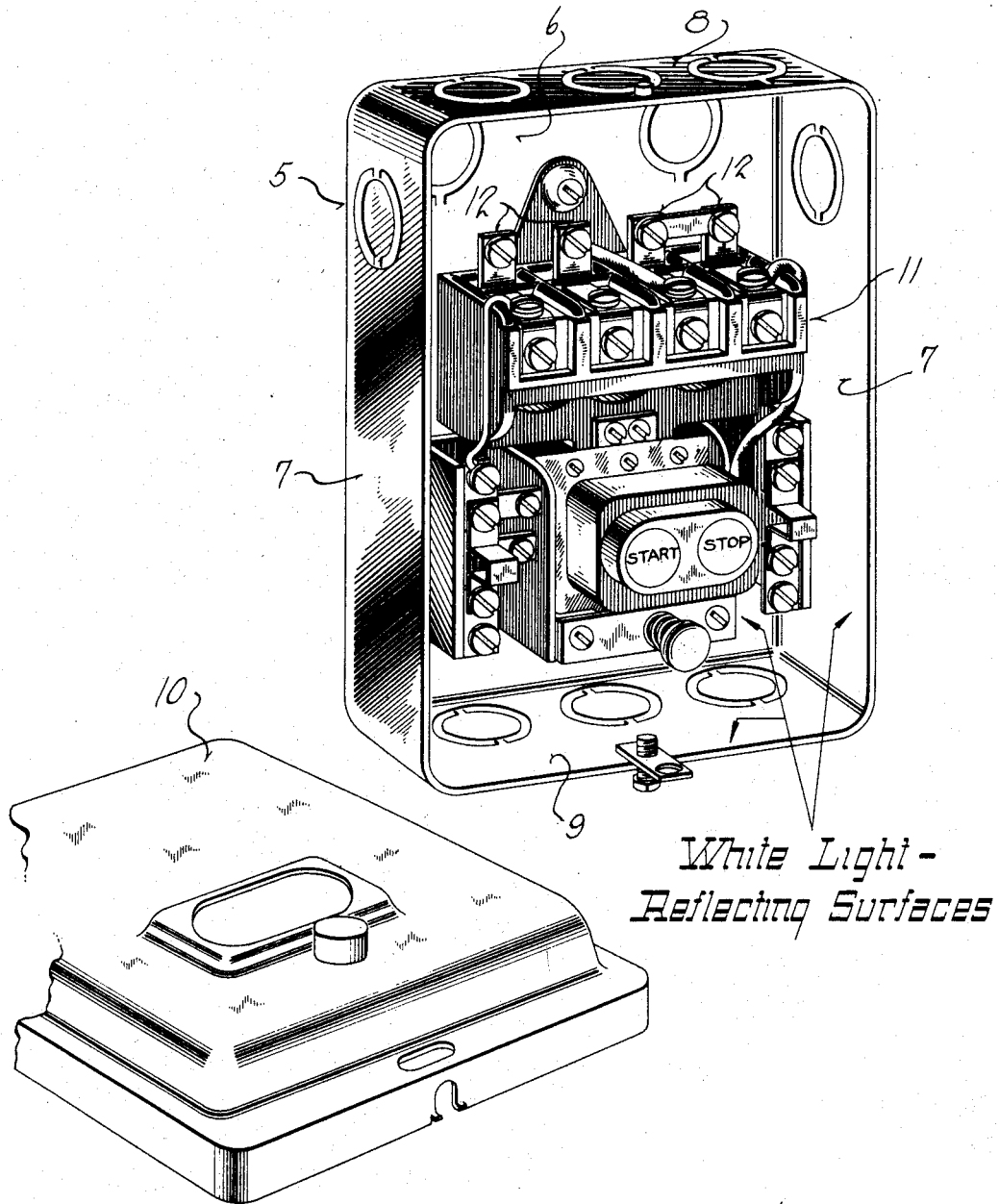
White Light-
Reflecting Surfaces
Inventor
Frederick F. Loock
By
Attorney Patented Dec. 8, 1936

2,063,099

UNITED STATES PATENT OFFICE 2,063,099

ENCLOSURE FOR ELECTRICAL DEVICES

Frederick F. Loock, River Hills, Wis., assignor to Allen-Bradley Company, Milwaukee, Wis., a corporation of Wisconsin Application July 30, 1934, Serial No. 737,614

1 Claim. (Cl. 247—9)

This invention relates to enclosures for electrical devices and the like and refers more particularly to enclosures for switches, relays and other electrical control equipment.

Heretofore, it has been customary to paint such enclosures black, both on the inside and outside, but a black surface is a poor reflector of light. Consequently, the interior of the enclosures was always dark, especially in view of the fact that the units are often mounted in basements, lofts and dark corners, and in bases of motor operated machines, where illumination is poor. Such poor lighting conditions make installation difficult and time consuming, and consequently are not conducive to good workmanship. In many instances the natural lighting conditions at the locations of installation are so inadequate that with the conventional type of enclosure, the use of additional lighting, not always readily available, was a prerequisite to any work on the unit.

It is therefore, an object of this invention to provide an enclosure for electrical devices and the like in which the internal surfaces have a high co-efficient of light reflection so that even in poorly lighted locations, the device within the enclosure and the connections thereto are readily visible.

Another object of this invention is to provide an enclosure of the character described in which the internal surfaces are light colored to not only facilitate the inspection and installation of connections to a device mounted therein, but also to afford an indication of the location of circuit breaks by the scorches produced on the enclosure walls by such circuit breaks, or by overheating as a result of any defective part and by grounds.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which:

The single figure is a perspective view of an enclosure embodying this invention with its cover removed and a magnetic switch mounted therein.

As seen in the accompanying drawing, the enclosure indicated generally by the numeral 5, comprises a rear wall 6, side walls 7 and top and bottom walls 8 and 9, respectively.

In the present instance, the enclosure is substantially rectangular and its front is adapted to be closed by a removable cover 10. It will be understood that for the purposes of the invention the particular shape of the enclosure is of no consequence.

Mounted within the enclosure, preferably on its rear wall 6, is an electrical device indicated generally by the numeral 11 and consisting in the present instance of a magnetically actuated switch having a plurality of terminals 12 to which connections are to be made for connecting the device in an electrical circuit.

The particular construction of the switch or other device mounted within the enclosure forms no part of this invention and is shown merely for purposes of illustrating the invention.

The inner walls of the enclosure are white or some other light color to afford light reflecting surfaces, and as the device in the enclosure is usually of a dark color, it stands out in sharp contrast to the light background so that inspection and installation of connections is materially facilitated.

To a degree the objects of the invention are attainable by placing a separate light colored plate behind the device or by painting only the rear wall white, but the more preferable and practical way is to paint the entire inside of the enclosure white.

Besides rendering the device and its terminals more visible, the light inner surfaces have the additional advantage of indicating the location of breaks in the circuits as the surfaces will become scorched adjacent such breaks and thereby afford a readily visible indication of the location of such breaks. In interconnected controls where several devices are mounted within a common enclosure, the light background also facilitates tracing the wiring as the wires are usually black or gray and thus clearly visible on the white background.

The outside surface of the enclosure is preferably painted black or some other dark color so as not to show soil marks produced during the usual handling which such enclosures are subjected to.

What I claim as my invention is:

In a cabinet for electrical instrumentalities having an insulated body portion and terminals on the exterior of the body portion, said cabinet comprising a sheet metal box, means for readily determining the location of a circuit break consisting of a light colored surface on the inside walls of the box which is readily discolored by arc burns caused by circuit breaks at or near the terminals.

FREDERICK F. LOOCK.